United States Patent Office 3,574,171
Patented Apr. 6, 1971

3,574,171
PROCESS FOR PRODUCING IMPROVED
BBB TYPE POLYMER
Edward C. Chenevey, North Plainfield, and Rufus S. Jones, Jr., Morristown, N.J., assignors to Celanese Corporation, New York, N.Y.
No Drawing. Filed Oct. 20, 1969, Ser. No. 867,879
Int. Cl. C08g 20/32, 20/38, 33/02
U.S. Cl. 260—78.4
22 Claims

ABSTRACT OF THE DISCLOSURE

A process is provided for producing an improved BBB type polymer, i.e. poly(bisbenzimidazobenzophenanthroline) and related nitrogenous polymers. The improved BBB type polymer is essentially free of unstable linkages and is formed by slurrying bulk polymer while in particulate form in a dilute aqueous solution of an alkaline compound selected from the group consisting of sodium hydroxide, potassium hydroxide, lithium hydroxide, ammonia, and mixtures of the foregoing. The polymer formed in the present process is particularly suited for the formation of thermally stable shaped articles, e.g. fibers or films, exhibiting improved tensile properties.

BACKGROUND OF THE INVENTION

In recent years considerable attention has been focused upon the development of polymers having high temperature resistance. Such polymers are useful, for instance, in the fabrication of articles including re-entry parachutes for space vehicles, and high temperature insulating materials, etc.

BBB type polymers, and particularly poly(bisbenzimidazobenzophenanthroline), when formed into fibers or films are recognized to be useful in the fabrication of extremely attractive products which are capable of withstanding highly elevated temperatures. These polymers in filamentary configuration have been formed for instance, as described in U.S. Ser. No. 657,868, filed Aug. 2, 1967, of Jay M. Steinberg and Arnold J. Rosenthal.

It is an object of the invention to produce improved BBB type polymer and more particularly poly(bisbenzimidazobenzophenanthroline) which is essentially free of unstable linkages.

It is another object of the invention to provide a process for modifying bulk BBB type polymer to produce a product which is capable of forming a drawn fiber or film exhibiting improved tensile properties.

It is a further object of the invention to provide a process for effectively lowering the ash content of BBB type polymer.

These and other objects, as well as the scope, nature, and utilization of the invention will be apparent from the following detailed description and appended claims.

SUMMARY OF THE INVENTION

It has been found that a process for improving properties of a BBB type polymer (preferably poly(bisbenzimidazobenzophenanthroline) formed by the condensation of 3,3'-diaminobenzidine and 1,4,5,8-naphthalene tetracarboxylic acid) comprises: (a) providing the polymer in particulate form, (b) slurrying the particulate polymer in a dilute aqueous solution of an alkaline compound selected from the group consisting of sodium hydroxide, potassium hydroxide, lithium hydroxide, ammonia, and mixtures of the foregoing, and (c) recovering the resulting polymer. The dilute aqueous solution of the alkaline compound may be at a temperature of about 20 to 200° C. while slurried with the particulate polymer, and most preferably at about 80 to 100° C. The dilute alkaline solution is provided in a copious quantity and may be about 0.01 to 10 N, and most preferably about 0.01 to 1 N.

The BBB type polymer formed in the present process is essentially free of unstable linkages and is capable of exhibiting a relatively constant inherent viscosity upon further exposure to the dilute aqueous solution of the alkaline compound.

DETAILED DESCRIPTION OF THE INVENTION

The BBB type polymer.

The present invention is generally applicable to improving the properties of BBB type polymers, i.e. poly(bisbenzimidazobenzophenanthroline) and related nitrogenous polymers.

The BBB type polymers which undergo treatment in the present process may be formed according to techniques heretofore employed in the art. As is now otherwise known in the art, these BBB type polymers may be produced by mixing and condensing (1) at least one organic tetra-amine having the structural formula

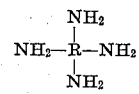

wherein R is an aromatic or cycloaliphatic tetravalent radical and wherein each of the four amino groups is attached directly to a carbon atom present in a ring of said aromatic or cycloaliphatic radical in a position which is ortho or peri to another carbon atom to which another of said amino groups is also directly attached; with (2) at least one tetracarboxylic acid (which also may be in the form of the corresponding dianhydride) having the structural formula

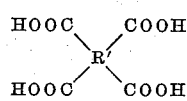

wherein R' is a tetravalent or cycloaliphatic radical wherein each of the four carboxyl groups is attached directly to a carbon atom present in a ring of said aromatic or cycloaliphatic radical in a position ortho or peri to another carbon atom to which another of said carboxyl groups is also directly attached. When R or R' is a substituted bicyclic fused ring compound, such as substituted naphthalene, the carbon atoms at the 1 and 8 positions are considered to be peri to each other as are the carbon atoms at the 4 and 5 positions. When R' is ortho carboxyl substituted, then five member rings are formed upon condensation with the tetra-amine; however, if R' is peri carboxyl substituted then six member rings are formed upon condensation with the tetra-amine. Additionally, adjoining 5 or 6 member rings will be formed depending upon whether R is ortho or peri amino substituted respectively. It is preferred that R and R' be aromatic rather than cycloaliphatic. It is preferred that R and R' contain up to about 20 carbon atoms.

The polymerization may be effected in an inorganic solvent, such as a phosphoric acid polymerization medium, by heating at temperatures of 80° C. to 300° C. (e.g. 100° C. to 250° C.) for a sufficient time to produce the desired molecular weight. Generally, such reaction periods can range from about 0.5 to 100 hours. Higher reaction temperatures tend to result in polymer having a higher inherent viscosity than polymers produced at lower temperatures and at comparable reaction periods. Alternatively, the reaction involved in the formation of these polymers may be effected in an organic liquid which is a solvent for at least one of the reactants, and is inert to the reactants, preferably under anhydrous conditions; at a temperature below 125° C., preferably below 100° C., and for a time sufficient to provide the desired condensation product without gelation. Subsequent high temperature heating is required to completely cyclize the polymer. The tetra-amine and the tetracarboxylic acid or corresponding dianhydride are preferably reacted in substantially equimolar quantities. The preferred polymerization medium is a phosphoric acid as discussed hereafter.

If an excessive reaction temperature is used, a product which is difficult or impossible to shape is obtained. But the permissible upper temperature limit will vary depending upon the monomer and solvent system used, the mutual proportions of the monomers, their concentration in the polymerization mixture and the minimum time that one desires for the reaction. The particular polymerization temperatures that should not be exceeded if a particular system is desired to provide a reaction product composed of a shapable polymer will accordingly vary from system to system but can be determined for any given system by a simple test by any person of ordinary skill in the art.

It is preferred that the molecular weight of the polymer used herein be such that its inherent viscosity be at least 0.3, preferably 0.5 to 5.0. The inherent viscosity is measured at 25° C. at a concentration of 0.4 g. of polymer per 100 ml. of solvent. Ninety-seven percent sulfuric acid (by weight) is a convenient and preferred solvent for use in making this viscosity determination though other solvents may be used similarly. The viscosity of the polymer solution is measured relative to that of the solvent and the inherent viscosity (I.V.) is determined from the following equation:

$$I.V. = \frac{\ln \frac{V_2}{V_1}}{C}$$

In the above formula, $V_2$ is the efflux time of the solution, $V_1$ is the efflux time of the solvent, and C is the concentration expressed in grams of polymer per 100 ml. of solution. As is known in the polymer art, inherent viscosity is monotonically related to the molecular weight of the polymer.

Non-limiting examples of the tetra-amine monomers which may be used individually or in mutual admixture in forming the desired polymers are: 3,3'-diaminobenzidine; bis(3,4-diamino phenyl) methane; 1,2-bis(3,4-diamino phenyl) ethane; 2,2-bis(3,4-diamino phenyl) propane; bis(3,4-diamino phenyl) ether; bis(3,4-diamino phenyl) sulfide; bis(3,4-diamino phenyl) sulfone; 1,2,4,5-tetra-amino benzene; 1,4,5,8 - tetra - aminonaphthalene; 2,3,6,7-tetra-amino naphthalene; etc.; and the corresponding ring-hydrogenated tetra-amines.

Non-limiting examples of the tetracarboxylic acids include; pyromellitic acid, i.e. 1,2,4,5-benzenetetracarboxylic acid; 2,3,6,7-naphthalene tetracarboxylic acid; 3,3', 4,4'-diphenyl tetracarboxylic acid; 1,4,5,8-naphthalene tetracarboxylic acid; 2,2',3,3'-diphenyl tetracarboxylic acid; 2,2-bis(3,4 - dicarboxyphenyl)propane; bis(3,4-dicarboxyphenyl) sulfone; 3,4,9,10-perylene tetracarboxylic acid; bis(3,4-dicarboxyphenyl) ether; ethylene tetracarboxylic acid, naphthalene-1,2,4,5-tetracarboxylic acid; decahydronaphthalene-1,4,5,8-tetracarboxylic acid; 4,8-dimethyl-1,2,3,5,6-hexahydronaphthalene - 1,2,5,6 - tetracarboxylic acid; 2,6-dichloronaphthalene-1,4,5,8-tetracarboxylic acid; 2,7-dichloronaphthalene-1,4,5,8-tetracarboxylic acid; 2,3,6,7-tetrachloronaphthalene-1,4,5,8-tetracarboxylic acid; phenanthrene-1,8,9,10-tetracarboxylic acid; cyclopentane - 1,2,3,4 - tetracarboxylic acid; pyrrolidine-2,3,4,5 - tetracarboxylic acid; pyrazine-2,3,5,6-tetracarboxylic acid; 2,2-bis(2,3-dicarboxyphenyl) propane; 1,1-bis(2,3-dicarboxyphenyl) ethane; 1,1-bis(3,4-dicarboxyphenyl) ethane; bis(2,3-dicarboxyphenyl) methane; bis-(3,4-dicarboxyphenyl) methane; bis(3,4-dicarboxyphenyl) sulfone; benzene-1,2,3,4-tetracarboxylic acid; 1,2,3,4-butane tetracarboxylic acid; thiophene-2,3,4,5-tetracarboxylic acid; and similar acids, as well as the dianhydrides of such acids. The preferred tetracarboxylic acids contain carboxyl groups peri substituted upon a naphthalene nucleus.

In a preferred embodiment, the present invention is directed to the improvement of polymer formed from poly(bisbenzimidazobenzophenanthroline). Such polymers may be formed from 1,4,5,8-naphthalene tetracarboxylic acid and 3,3'-diamino benzidine as exemplified by the following equation. While various isomers are commonly produced in the reaction as will be apparent to those skilled in the art, only one is shown.

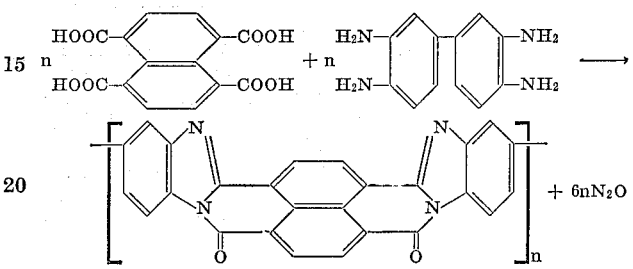

In a preferred technique for forming the BBB type polymer the condensation reaction is conducted while the reactants are agitated in the presence of a phosphoric acid polymerization medium. The reactants are provided in essentially equimolar quantities. From about 10 to 40 kilograms, and preferably about 15 to 25 kilograms of the phosphoric acid polymerization medium are provided per gram mole of the reactants. The phosphoric acid polymerization medium utilized may be of varied concentration, and may contain an $H_3PO_4$ concentration of about 50 to 117 percent by weight, or about 36 to 85 percent by weight expressed as $P_2O_5$. For instance, a polymerization medium may be selected which contains a relatively high $H_3PO_4$ concentration of about 104 to 117 percent by weight, or about 75 to 85 percent by weight expressed as $P_2O_5$. In a particularly preferred polymer forming technique the phosphoric acid polymerization medium contains an $H_3PO_4$ concentration of about 104 to 109 percent by weight or about 75 to 79 percent by weight expressed as $P_2O_5$, in accordance with the teachings of commonly assigned U.S. Ser. No. 867,878 of Edward C. Chenevey, filed concurrently herewith, which is herein incorporated by reference. The acid concentration expressed as $H_3PO_4$ may be determined by mixing the phosphoric acid with water and titrating with a standard base after warming to allow depolymerization.

The phosphoric acid medium selected may be commercially available polyphosphoric acid, or alternatively, it may be formed upon dilution with water of a more concentrated phosphoric acid. For instance, polyphosphoric acid is commercially available containing an $H_3PO_4$ concentration of about 115 percent by weight, and a $P_2O_5$ equivalent of about 82 to 84 percent by weight. Such a highly concentrated polyphosphoric acid prior to dilution is a solution of approximately 5 to 20 percent ortho- and pyrophosphoric acids mixed with various more highly polymerized polyphosphoric acids, mostly trimers, tetramers, pentamers, and hexamers. This acid may be used without modification or diluted with water to form a lesser concentrated polymerization medium. Upon dilution with water the higher acids present in the same tend to revert to orthophosphoric acid. Other commercially available phosphoric acids which may be selected include superphosphoric acid, and othrophosphoric acid.

Treatment with dilute aqueous solution of the alkaline compound

The BBB type polymer is provided in a particulate form prior to being slurried with a dilute aqueous solution of the alkaline compound (described hereafter) in accordance with the present invention. The particulate configuration of the polymer provides a substantial contact area for the dilute aqueous solution of the alkaline compound. Satisfactory particle size dimensions commonly range from about 0.01 to 10 mm., and most preferably from about .5 to 2 mm. The technique selected for providing the polymer in particulate form may be varied as will be apparent to those skilled in the art and includes comminution procedures such as chopping, grinding, etc. In a preferred embodiment of the invention the BBB type polymer is precipitated from its polymerization medium to form a fibrous solid. Precipitation may be conducted by agitating the polymerization medium containing the polymer with water. For example, a phosphoric acid polymerization medium containing the BBB type polymer may be precipitated under high shear conditions such as by gradually pouring into a Waring Blendor containing water. The particulate solid produced under such conditions commonly exhibits a fibrous configuration of irregular dimensions. The exact particle size of the BBB type polymer prior to treatment with the dilute aqueous solution of an alkaline compound in accordance with the present invention is not critical. It is recommended, however, that the particulate solid exhibit a relatively high surface area for optimum results.

It is further recommended that the particulate BBB type polymer be washed to remove residual amounts of the polymerization medium prior to undergoing treatment with the dilute aqueous solution of the alkaline compound. Such washing may be conducted with water and may serve to remove the phosphoric acid polymerization medium which would otherwise consume at least a portion of the alkaline compound. The water wash is preferably conducted while the polymer is suspended by stirring in boiling water until an essentially neutral pH is observed in the wash solution while in contact with the particulate solid. It is commonly necessary to change the wash solution several times before an essentially neutral pH is observed.

The alkaline compound employed in the process is selected from the group consisting of sodium hydroxide, potassium hydroxide, lithium hydroxide, ammonia, and mixtures of any or all of the same. The preferred alkaline compound is sodium hydroxide. The alkaline compound is provided as a dilute aqueous solution. For example, aqueous solutions which contain the compound in a concentration of about 0.01 to 10 N may be selected. In a preferred embodiment of the invention the aqueous solutions of the alkaline compound are about 0.01 to 1 N. Particularly satisfactory results have been achieved employing a solution of about 0.125 N. Solutions of the alkali metal hydroxides (sodium hydroxide, potassium hydroxide, and lithium hydroxide) may be handled more readily than the highly volatile ammonia solution (i.e. ammonium hydroxide).

The particulate BBB type polymer is suspended within and agitated with a copious quantity of the dilute aqueous solution of an alkaline compound. Whenever the polymer has been precipitated in water, it commonly assumes a very fine at least partially swollen fibrous consistency which requires a substantial quantity of the dilute aqueous solution of the alkaline compound to effectively suspend the same when accompanied by agitation. The exact quantity of dilute aqueous solution of the alkaline compound per unit weight of polymer is not critical. One merely selects an adequate quantity of the alkaline solution to suspend the polymer undergoing treatment, and to form a freely flowing readily stirrable slurry. A viscous slurry in which free agitation and intimate admixture of the polymer and solution are retarded is not recommended. For example, approximately 1 to 10 moles of the alkaline compound present in a 0.125 N solution conveniently may be present per each mole of repeating unit of the BBB type polymer.

The temperature of the dilute aqueous solution of the alkaline compound while slurried with the particulate polymer may be varied, e.g. from about 20 to 200° C. In a preferred embodiment of the invention the temperature is elevated, e.g. about 80 to 100° C. Particularly satisfactory results are achieved when the solution containing the polymer suspended therein is boiled, while at atmopsheric pressure. As will be apparent to those skilled in the art, a closed reaction system which will inherently be at superatmospheric pressure will be required when operating at temperatures of 100° C. or above. Whenever an ammonium hydroxide solution is selected, it is recommended that the treatment vessel be closed to prevent loss of ammonia gas from the system.

The time required to complete the treatment of the particulate BBB type polymer while in contact with the dilute aqueous solution of the alkaline compound varies with the temperature of the solution. Generally, the higher the temperature, the shorter the time required to complete the modification of the polymer. Suitable periods for polymer treatment commonly range from about 10 minutes to two or more days, i.e. about 10 minutes to 48 hours, or more. In a preferred embodiment of the invention in which the slurry is maintained at a temperature of about 80 to 100° C., treatment times of about 30 minutes to 2 hours may be selected.

The theory whereby the properties of BBB type polymer are enhanced through the use of the present process is considered complex and incapable of simple explanation. It has been observed, however, that the inherent viscosity (defined above) of the bulk BBB type polymer initially decreases upon contact with the dilute aqueous solution of the alkaline compound (i.e. the alkali metal hydroxide or ammonia) and that this decrease subsequently levels off at a relatively constant value upon further exposure to the solution. Such decrease in inherent viscosity is attributed to a destruction of unstable or hydrolyzable polymer linkages, and an ultimate product is yielded which is capable of exhibiting improved physical and thermal properties. The modified bulk polymer produced in the present process is essentially free of unstable polymer linkages. The fact that the drop in the inherent viscosity levels off and attains a relatively constant level is indicative that the BBB type polymer is not being continuously degraded, and that a stable polymer remains upon further subjection to the dilute aqueous solution of the alkaline compound.

The resulting polyer subsequent to its treatment with the dilute aqueous solution the alkaline compound is recovered by any convenient means, such as filtration, centrifugation, etc.

In order to yield a polymer exhibiting optimum properties it is recommended that the resulting particulate solid next be washed to remove residual base and dried. For example, the polymer may be washed with water, acidified with a dilute mineral acid such as hydrochloric acid to remove any remaining base, again washed with water, and dried. Drying may be conveniently conducted in a vacuum oven at about 140° C.

The improved BBB type polymer formed in the present process has been found to exhibit a substantially lower ash content than commonly observed in polymers of this type. For example, ash contents of less than 0.1 percent by weight are generally observed in polymer resulting from the present process. Such ash content is commonly attributed to contamination such as calcium, magnesium, silicon, iron, etc., and is believed to contribute to polymer instability in conjunction with the unstable hydrolyzable polymer linkages which are destroyed in the instant process.

Formation of shaped articles

As has been previously described in the art, BBB type polymers can be formed into shaped articles such as fibers or films by extruding a solution of the polymer in an appropriate solvent, such as sulfuric acid, through an opening of predetermined shape into a coagulation bath, e.g., a sulfuric acid-water coagulation bath, which results in a filamentary or film material of the desired cross-section.

Polymer solutions may be prepared, for example, by dissolving sufficient polymer in the solvent to yield a final solution suitable for extrusion which contains about 2 to 15 percent by weight, preferably about 3 to 10 percent by weight, of polymer based on the total weight of the solution. It is found that the polymer dissolves most readily on warming to a temperature of between about 50 to 70° C. to produce a viscous, deep purple solution. The sulfuric acid concentration for the spinning solvent preferably has an equivalent $H_2SO_4$ content of about 92 to 102 percent. The polymeric spinning solution is then extruded into a coagulation bath, i.e., wet spun, to form filaments which are then washed, dried and hot drawn and ultimately may optionally be passed through a hot flame or an equivalent high temperature zone as fully described in the United States Ser. No. 681,136, filed Nov. 7, 1967, of Jay M. Steinberg and Arnold J. Rosenthal to which reference may be had for further details.

As has been described in co-pending application Ser. No. 657,868, filed Aug. 2, 1967, of Jay M. Steinberg and Arnold J. Rosenthal, while filaments of satisfactory properties can be made from BBB type polymers under a variety of spinning conditions, filaments possessing superior properties can be obtained by maintaining the coagulation bath within certain parameters. For instance, when spinning a solution of a BBB type polymer having an inherent viscosity between about 1.0 and 4.0, preferably between 2 and 3, and using an aqueous sulfuric acid coagulation bath, it is desirable to maintain such a bath at a temperature between about 45 to 80° C., preferably between 55 and 70° C., and to maintain the sulfuric aicd concentration in the bath between about 50 and 80 percent by weight, optimally between about 65 and 75 percent. When operating within these parameters, a precursor (as spun) fiber is obtained which is suitable for producing after drawn fibers of superior tensile properties and strength retention at the extreme elevated temperatures for which the present invention is intended.

After wet spinning, as spun fibers are washed thoroughly in order to remove excess acid and to minimize contamination. Then, they are dried prior to being hot drawn in order to improve their physical characteristics, e.g., tenacity, elongation, thermal resistance, etc. The BBB type polymer of the present process is capable of forming drawn shaped articles which exhibit superior tensile properties than those formed by conventional techniques which lack the bulk polymer treatment heretofore described. Afterdrawing of the spun filaments is desirably performed at temperatures between about 500 and 700° C. at a draw ratio from greater than 1:1 to about 4:1 (e.g. 1.1:1 to 4:1) and preferably between 1.5:1 and 2.5:1. Fibers of BBB type polymer drawn in this manner may have a strength in excess of 3 grams per denier and thermal resistance at temperatures as high as 700 or 800° C. Reference may be made to commonly assigned United States Ser. No. 867,857 of Jay M. Steinberg, filed concurrently herewith, and herein incorporated by reference, for a detailed description of preferred drawing conditions for fibers and films.

The following example is given as a specific illustration of the invention. It should be understood, however, that the invention is not limited to the specific details set forth in the example.

EXAMPLE

Equimolar quantities of 1,4,5,8-naphthalene tetracarboxylic acid and 3,3'-diamino benzidine were added to a closed reaction vessel provided with a central stirrer. The reactants while at room temperature were filled with a nitrogen atmosphere and degassed three times through the use of a vacuum pump. Subsequent to degassing air was excluded from the interior of the reaction vessel by a flow of nitrogen.

Polyphosphoric acid having an $H_3PO_4$ concentration of 107.4 percent by weight and of 78 percent by weight expressed as $P_2O_5$ was selected as the polymerization medium. The polyphosphoric acid polymerization medium was formed from commericially available polyphosphoric acid having an $H_3PO_4$ concentration of 115 percent by weight by dilution with water. The polyphosphoric acid was heated to 100° C. and a vacuum was applied to the same to remove air. The polyphosphoric acid was cooled to below 80° C. and incrementally added to the reaction vessel with moderate stirring over a period of 15 minutes in a total quantity equivalent to 24 kg. of the polyphosphoric acid per mole of the reactants to form a thick slurry. The 3,3'-diamino benzidine largely dissolved while the 1,4,5,8-naphthalene tetracarboxylic acid remained as a solid in the slurry.

When the introduction of the polyphosphoric acid was begun, heat was applied to the reaction vessel. After approximately 30 minutes the contents of the reaction vessel reached 100° C. The stirring speed was then set at 150 r.p.m. The reaction vessel was maintained at 100° C. for approximately 1 hour and 30 minutes to insure adequate admixture of the reactants, and then the temperature of the reaction vessel was progressively raised at a rate of 12.5° C. per hour. After 7.2 hours a temperature of 190° C. was achieved, and this temperature was maintained for 11.2 hours during which time the bulk of the polymerization occurred. The poly(bisbenzimidazobenzophenanthroline) formed consisted of several different isomers one of which may be identified as poly[6,9-dihydro-6,9-dioxobisbenzimidazo(2,1 - b:1',2" - j)benzo(lmn)(3,8)phenanthroline-2,13-diyl].

The contents of the reaction vessel were next poured into a separate vessel provided with a central agitator containing a copious quantity of deionized water to precipitate the polymer as a particulate fibrous solid capable of passing a sieve of approximately 10 mesh. The temperature of the water was raised to the boiling point, and the deionized water was replaced several times to produce a water washed polymer having an I.V. of 3.34 suspended by stirring in essentially neutral deionized water.

The particulate bulk polymer was removed from the deionized water by filtration, and was placed in a vessel provided with a central agitator containing a copious quantity of a 0.125 N aqueous sodium hydroxide solution. Approximately 6 moles of sodium hydroxide were provided per each mole of repeating polymer unit, and the particulate polymer was present as a freely flowing slurry. The aqueous sodium hydroxide solution was maintained at the boiling point (100° C.) for 1 hour after which time the I.V. of the polymer assumed a relatively constant value of 2.34.

The resulting polymer was recover by filtration, washed by placement in boiling deionized water with agitation for 1 hour, recovered by filtration, acidified with hot aqueous hydrochloric acid at 100° C. for 1 hour, recovered by filtration, and again washed with deionized water at 100° C. The polymer was next dried to constant weight in a vacuum oven at 140° C.

The particulate polymer was dissolved in 97 percent by weight $H_2SO_4$ at 60° C. to form a spinning solution containing 5.7 percent solids by weight. The spinning solution was charged to a conventional dope bomb and extruded under nitrogen pressure into a 100 cm. coagulation bath at a rate of 2.6 m./min. The spinneret was a 10-fil, 100 micron jet. The coagulation bath was aqueous sulfuric acid containing 72 percent $H_2SO_4$ by weight which was maintained at 60° C. The resulting fiber was next washed in ammonium hydroxide having a temperature of about 85° C. and a pH of about 8, and subsequently in water having a temperature of about 70° C. The as spun fiber had a denier per filament of 15, an elongation (percent) of 74, a tenacity in grams per denier of 1.34, and a tensile factor (TE 1/2) of 11.5.

The fiber was dried at room conditions and drawn in a one foot muffle furnace having an air atmosphere at a feed speed of 2 m./min. at the temperatures and draw ratios indicated in the table. The fiber was drawn according to the teachings of commonly assigned United States Ser. No. 867,857 of Jay M. Steinberg, filed concurrently herewith, which is herein incorporated by reference.

COMPARATIVE EXAMPLE

The example described above was repeated with the exception that 3.34 I.V. particulate polymer obtained from the phosphoric acid polymerization medium was not subjected to the slurrying treatment with the aqueous solution of sodium hydroxide. The water washed particulate polymer was dissolved in 97 percent by weight $H_2SO_4$ at 60° C. to form a spinning solution containing 3.7 percent solids by weight, and was extruded and drawn as described in the above example. The as spun fiber had a denier per filament of 11.3, an elongation (percent) of 73, a tenacity in grams per denier of 1.15, and a tensile factor (TE 1/2) of 9.8.

The following table provides a comparison of the properties of the after-drawn fibers produced in the example and in the comparative example.

wherein R is an aromatic or cycloaliphatic tetravalent radical and wherein each of the four amine groups is attached directly to a carbon atom present in a ring of said aromatic or cycloaliphatic radical in a position which is ortho or peri to another carbon atom to which another of said amino groups is also directly attached, and (2) at least one tetracarboxylic acid or its corresponding dianhydride having the structural formula

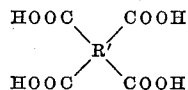

wherein R' is a tetravalent aromatic or cycloaliphatic radical wherein each of the four carboxyl groups is attached directly to a carbon atom present in a ring of said aromatic or cycloaliphatic radical in a position ortho or peri to another carbon atom to which another of said carboxyl groups is also directly attached, comprising:

(a) providing said polymer in particulate form,
(b) slurrying said particulate polymer in a dilute aqueous solution of an alkaline compound selected from the group consisting of sodium hydroxide, potassium hydroxide, lithium hy-

TABLE

| | | With NaOH treatment, example | | | | Without NaOH treatment, comparative example | | | |
|---|---|---|---|---|---|---|---|---|---|
| Draw | Draw ratio | DPF | Elongation [1] | Tenacity [2] | TE 1/2 | DPF | Elongation [1] | Tenacity [2] | TE 1/2 |
| Temperature, °C.: | | | | | | | | | |
| 525 | 1.5 | 7.7 | 14.4 | 3.30 | 12.5 | 6.7 | 14.8 | 2.45 | 9.4 |
| | 1.8 | 7.0 | 6.8 | 4.16 | 10.9 | 5.4 | 5.1 | 3.85 | 8.7 |
| | 2.1 | | Not tested | | | 5.8 | 6.0 | 3.29 | 9.3 |
| 550 | 1.5 | 8.6 | 9.3 | 3.30 | 10.1 | 6.6 | 11.8 | 2.95 | 10.1 |
| | 1.8 | 8.0 | 8.5 | 4.13 | 12.1 | 5.3 | 4.5 | 4.55 | 9.7 |
| | 2.1 | | Not tested | | | 5.2 | 3.6 | 4.59 | 8.7 |
| 575 | 1.5 | 8.1 | 10.9 | 3.74 | 12.3 | 7.9 | 11.6 | 2.74 | 9.3 |
| | 1.8 | 7.0 | 5.0 | 4.91 | 10.9 | 6.4 | 5.6 | 4.0 | 9.5 |
| | 2.1 | | Not tested | | | 5.8 | 4.6 | 4.34 | 9.3 |
| 600 | 1.5 | 7.5 | 6.3 | 4.14 | 10.8 | 6.0 | 6.0 | 3.8 | 9.3 |
| | 1.8 | 6.9 | 4.9 | 4.79 | 10.6 | 5.2 | 3.9 | 5.2 | 10.3 |
| | 2.1 | 6.5 | 3.6 | 4.3 | 9.1 | 4.6 | 2.5 | 4.5 | 7.1 |

[1] In percent.
[2] In grams per denier.

NOTE:
DPF=denier per filament.
TE 1/2=index of fiber organization wherein T is tenacity at break in grams per denier and E is elongation in percent extension from original length at break in tensile test. An explanation of this test and its significance is given in the Textile Research Journal 36, No. 7, pages 593-602, July 1966.

From a comparison of the above properties it is apparent that the poly(bisbenzimidazobenzophenanthroline) polymer formed in accordance with the present invention exhibits superior tensile properties. The average TE 1/2 for the drawn fiber formed from the polymer which was treated in the dilute aqueous solution of sodium hydroxide was 11.0, while the average TE 1/2 for the drawn fiber formed from the polymer which lacked this treatment was 9.2. Similar results are obtainable with other BBB type polymers, or when substituting potassium hydroxide, lithium hydroxide, or ammonium hydroxide for sodium hydroxide.

The scope, nature, operation and advantages of the invention having been described and exemplified in the foregoing description, the subject matter for which patent protection is sought herein is particularly pointed out in the appended claims.

We claim:
1. A process for improving properties of BBB type polymer formed by the condensation of
(1) at least one organic tetra-amine having the formula

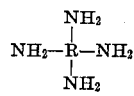

droxide, ammonia, and mixtures of the foregoing, and
(c) recovering the resulting polymer.

2. A process according to claim 1 wherein said BBB type polymer is poly(bisbenzimidazobenzophenanthroline).

3. A process according to claim 1 wherein said dilute aqueous solution of alkaline compound is about 0.01 to 10 N, and said polymer is slurried therein for about 10 minutes to 48 hours.

4. A process according to claim 1 wherein said dilute aqueous solution of alkaline compound is at about 20 to 200° C. while slurried with said particulate polymer.

5. A process according to claim 1 wherein said slurrying is conducted at about 80 to 100° C. for about 30 minutes to 2 hours.

6. A process according to claim 1 wherein said dilute aqueous solution of alkaline compound is a 0.01 to 1 N sodium hydroxide solution.

7. A process according to claim 1 wherein said resulting polymer following its recovery is washed with water, acidified, and again washed with water.

8. In a process for producing BBB type polymer comprising condensing with intimate admixture in a phosphoric acid polymerization medium at a temperature of about 80 to 300° C.

(1) at least one organic tetra-amine having the structural formula

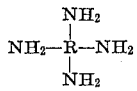

wherein R is an aromatic or cycloaliphatic tetravalent radical and wherein each of the four amino groups is attached directly to a carbon atom present in a ring of said aromatic or cycloaliphatic radical in a position which is ortho or peri to another carbon atom to which another of said amino groups is also directly attached, and (2) at least one tetracarboxylic acid or its corresponding dianhydride having the structural formula

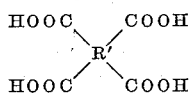

wherein R' is a tetravalent aromatic or cycloaliphatic radical wherein each of the four carboxyl groups is attached directly to a carbon atom present in a ring of said aromatic or cycloaliphatic radical in a position ortho or peri to another carbon atom to which another of said carboxyl groups is also directly attached, in which a bulk polymer is formed which is subject to a reduction in inherent viscosity when in the presence of a dilute aqueous solution of an alkaline compound selected from the group consisting of sodium hydroxide, potassium hydroxide, lithium hydroxide and ammonia, the improvement of precipitating said polymer from said phosphoric acid polymerization medium to form a particulate solid, slurrying said particulate solid in a dilute aqueous solution of an alkaline compound selected from the group consisting of sodium hydroxide, potassium hydroxide, lithium hydroxide, ammonia and mixtures of the foregoing until said BBB type polymer upon exposure to said solution attains a relatively constant inherent viscosity, and recovering the resulting polymer.

9. A process according to claim 8 wherein said phosphoric acid polymerization medium has an $H_3PO_4$ concentration of about 104 to 117 percent by weight.

10. A process according to claim 8 wherein said BBB type polymer is a condensation product of 3,3'-diamino benzidine and 1,4,5,8-naphthalene tetracarboxylic acid.

11. A process according to claim 8 wherein said polymer is precipitated from said phosphoric acid polymerization medium by agitation with water, and the particulate solid is washed prior to slurrying with said dilute aqueous solution of alkaline compound.

12. A process according to claim 8 wherein said dilute aqueous solution of alkaline compound is about 0.01 to 10 N.

13. A process according to claim 8 wherein said dilute aqueous solution of alkaline compound is at about 20 to 200° C. while slurried with said particulate solid.

14. A process according to claim 8 wherein said dilute aqueous solution of alkaline compound is a 0.01 to 1 N sodium hydroxide solution.

15. A process according to claim 8 wherein said resulting polymer following its recovery is washed with water, acidified, and again washed with water.

16. In a process for forming poly(bisbenzimidazobenzophenanthroline) comprising condensing with intimate admixture 3,3'-diamino benzidine and 1,4,5,8-naphthalene tetracarboxylic acid while present in a phosphoric acid polymerization medium having a temperature of 80 to 300° C. and an $H_3PO_4$ concentration of about 104 to 117 percent by weight in which a polymer is formed which is subject to a reduction in inherent viscosity when in the presence of a dilute aqueous solution of an alkaline compound selected from the group consisting of sodium hydroxide, potassium hydroxide, lithium hydroxide and ammonia; the improvement of precipitating said polymer from said phosphoric acid polymerization medium by agitation with water to form a particulate solid, washing the particulate solid, slurrying said washed particulate solid in a 0.01 to 1 N aqueous solution of an alkaline compound selected from the group consisting of sodium hydroxide, potassium hydroxide, lithium hydroxide, ammonia and mixtures of the foregoing at a temperature of about 20 to 200° C. until said poly(bisbenzimidazobenzophenanthroline) upon exposure to said solution attains a relatively constant inherent viscosity, and recovering the resulting polymer.

17. A process according to claim 16 wherein said slurrying is conducted for about 10 minutes to 48 hours.

18. A process according to claim 16 wherein said dilute aqueous solution of an alkaline compound is at a temperature of about 80 to 100° C. when slurried with said particulate solid.

19. A process according to claim 18 wherein said slurrying is conducted for about 30 minutes to 2 hours.

20. A process according to claim 16 wherein said dilute aqueous solution of an alkaline compound is a sodium hydroxide solution.

21. A process according to claim 16 wherein said resulting polymer following its recovery is washed with water, acidified, and again washed with water.

22. An improved BBB type polymer formed by the condensation of (1) at least one organic tetra-amine having the structural formula

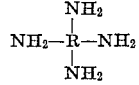

wherein R is an aromatic or cycloaliphatic tetravalent radical and wherein each of the four amino groups is attached directly to a carbon atom present in a ring of said aromatic or cycloaliphatic radical in a position ortho or peri to another carbon atom to which another of said amino groups is also directly attached, and (2) at least one tetracarboxylic acid or its corresponding dianhydride having the structural formula

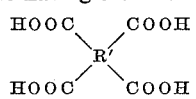

wherein R' is a tetravalent aromatic or cycloaliphatic radical wherein each of the four carboxyl groups is attached directly to a carbon atom present in a ring of said aromatic or cycloaliphatic radical in a position ortho or peri to another carbon atom to which another of said carboxyl groups is also directly attached, which is essentially free of unstable linkages and capable of exhibiting a relatively constant inherent viscosity upon exposure to a dilute aqueous solution of an alkali metal hydroxide or ammonia formed by slurrying said polymer while in particulate form in a dilute aqueous solution of an alkaline compound selected from the group consisting of sodium hydroxide, potassium hydroxide, lithium hydroxide, ammonia and mixtures of the foregoing.

References Cited
UNITED STATES PATENTS 3,414,543   12/1968   Paufler _____ 260—47
3,518,232   6/1970    Bell _____ 260—78

JOSEPH L. SCHOFER, Primary Examiner

J. KIGHT III, Assistant Examiner

U.S. Cl. X.R.

260—30.6, 47, 78